June 9, 1953    J. T. OFFUTT    2,641,654
COMBINATION CHRONOMETER AND SOUND REPRODUCING INSTRUMENT
Filed May 31, 1949    6 Sheets-Sheet 1

INVENTOR.
John T. Offutt
BY
ATTORNEY.

INVENTOR.
John T. Offutt

ATTORNEY.

INVENTOR.
John T. Offutt
BY
ATTORNEY.

June 9, 1953     J. T. OFFUTT     2,641,654
COMBINATION CHRONOMETER AND SOUND REPRODUCING INSTRUMENT
Filed May 31, 1949     6 Sheets-Sheet 5

Fig. 10.

INVENTOR.
John T. Offutt
BY

ATTORNEY.

Fig. 13.

Patented June 9, 1953

2,641,654

UNITED STATES PATENT OFFICE 2,641,654

COMBINATION CHRONOMETER AND SOUND REPRODUCING INSTRUMENT

John T. Offutt, Parkville, Mo., assignor of one-fourth to Raymond W. Gregg, Parkville, Mo.

Application May 31, 1949, Serial No. 96,357

9 Claims. (Cl. 179—100.1)

This invention relates to sound reproducing apparatus in combination with a timepiece operable to reproduce previously recorded sounds of a predetermined nature at a given time or times and for a predetermined duration in each instance whereby the time of day may be periodically made known in an audible manner and other announcements may be produced at specified times either in the form of advertising at public gatherings or other events including use in the field of radio, if desired.

It is the most important object of the present invention to combine a chronometer with a sound reproducer in such a manner as to cause operation of the latter at preselected times during a twelve hour period of time in one modification thereof and during a 24 hour period of time in another of the modifications of the present invention.

Another important object of this invention is to provide a combination chronometer and sound reproducing instrument having mechanical means interconnecting the main rotatable shaft of the chronometer with electric instrumentalities disposed within the electrical circuits forming a part of the reproducer for causing periodic forward movement of the sound track of the reproducer, together with periodic closing of the electric circuit of the pick-up head and amplifier, either simultaneously with each sound track movement or during only a pre-selected number of such track movements.

Another important object of the present invention is to provide a combined timepiece and sound reproducer having manual selecting means rendering it possible for the operator to set the apparatus for producing audible sounds at any desired moment or moments during a 24 hour period of time and also rendering the apparatus inoperable from the standpoint of audible announcements at any desired time after a selected operation.

Other objects of the present invention include the manner in which the apparatus is rendered continuously operable through sound track reversing mechanism; the way in which the instrument may be manually adjusted for synchronization of all parts; the manner in which the amplifier of the sound reproducer is energized a sufficient period of time to provide proper heating of the tube filaments thereof prior to movement of the sound track; and the way in which the entire apparatus is made and assembled to permit use of sound reproducers and of timepieces having characteristics differing from that chosen for illustration herein.

In Figs. 1 to 4 inclusive, there is shown a case that may take any desired form and that is broadly designated by the numeral 14.

Figure 1:
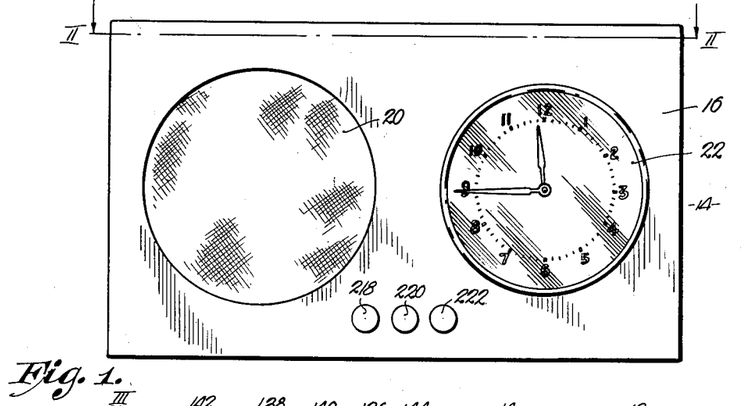
Fig. 1 is a front elevational view of a combination chronometer and sound reproducing instrument made in accordance with my present invention.
Figure 2:
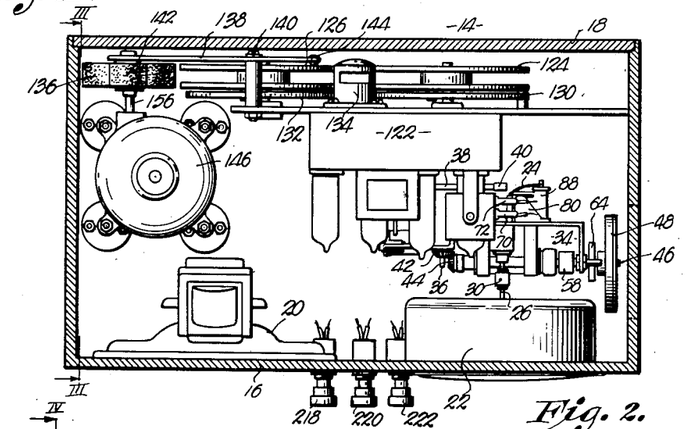
Fig. 2 is a transverse, cross-sectional view taken on line II—II of Fig. 1 looking in the direction of the arrows.
Figure 3:
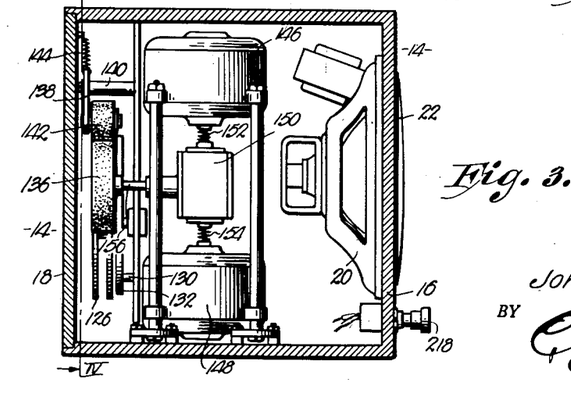
Fig. 3 is a transverse, cross-sectional view taken on line III—III of Fig. 2 looking in the direction of the arrows.

Case 14 is provided with a front panel 16 and a removable rear panel 18. Panel or wall 16 has a pair of openings therein, one of which clears a loud speaker 20, and the other opening is provided for receiving a chronometer or timepiece of any suitable character and constituting an ordinary clock 22.

Clock 22 is preferably electrically operated and provided with a motor 24 shown only in Fig. 10, the electrical connection thereof being hereinafter more fully described. Clock 22 is provided with the usual main shaft 26 that is connected directly to a short, extended shaft 28 by a knurled coupling 30. Coupling 30 therefore, provides for manually changing the time setting of clock 22, and obviously, if desired, suitable manual control means might be extended from shaft 26 or shaft 28 to the exterior of case 14 to facilitate such time-setting operation.

The shaft 28 is rotatably mounted within a bearing 32 that is in turn supported by framework broadly designated by the numeral 34 and shown in Figs. 5 to 8 inclusive entirely removed from within the case 14. Frame 34 also rotatably carries a shaft 36 that is in parallel spaced relationship to the shaft 28 and connected thereto through the medium of a large gear 38 and pinion 40 on shafts 36 and 28 respectively.

That end of the shaft 36 opposite to gear 38 is provided with a bevel gear 42 that meshes with an identical bevel gear 44 mounted on an elongated shaft 46. Shaft 46 rotatably carried by the frame 34 is in perpendicular relationship to the shafts 36 and 28 and intersects the latter.

For purposes hereinafter made more clear, the ratio between gears 40 and 38 is 12 to 1. That end of the shaft 46 opposite to the gear 44 thereon, has a disc-like dial 48 secured directly thereto. It is seen that because of the train of gears interconnecting dial 48, the latter will rotate anti-clockwise as shown by the arrow in Fig. 9 or opposite to the direction of travel of the clock shaft 26.

It is also apparent that dial 48 rotates at the same speed as gear 38, which speed is $\frac{1}{12}$ of the speed of rotation of shafts 26 and 28. Shaft 26, rotating a complete cycle each hour, or 12 revolutions in a 12 hour period of time, causes dial 48 to make one complete revolution each 12 hours.

Figure 9:
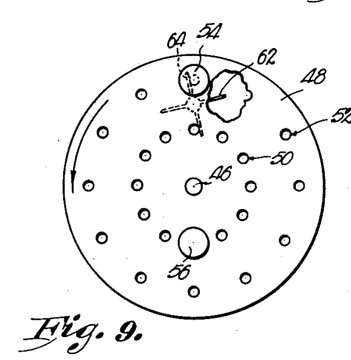
Fig. 9 is a plan view of the selector dial per se.

Dial 48 is provided with two concentric rows of openings 50 and 52, there being 12 equally spaced openings in each row thereof. Each opening of each row 50 and 52 thereof, relates to one hour of time or to one complete cycle of revolution of shaft 26.

Figure 5:
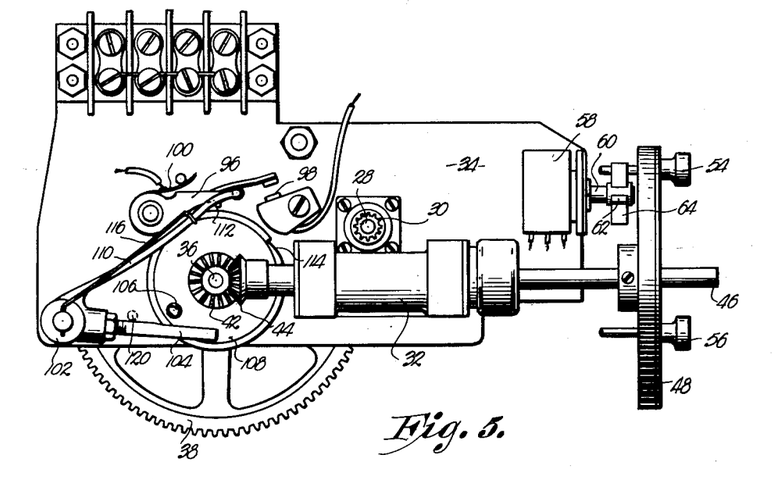
Fig. 5 is an enlarged, side elevational view of a portion of the reproducer control means showing the same entirely detached from the chronometer.
Figure 6:
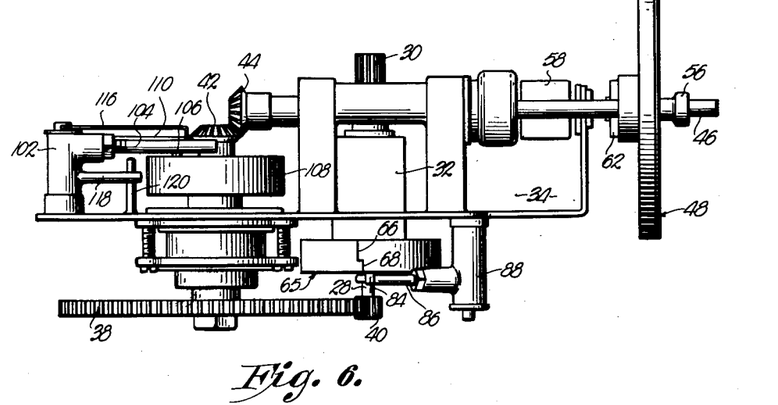
Fig. 6 is an inverted plan view of the mechanism illustrated in Fig. 5.
Figure 7:
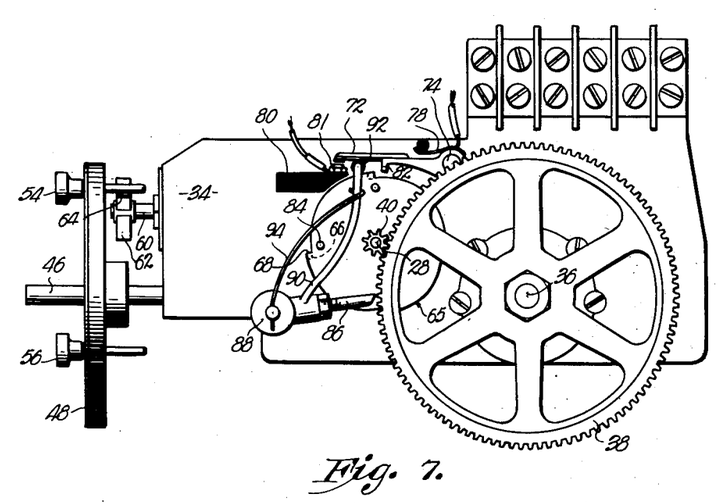
Fig. 7 is an elevational view showing the opposite side of the structure illustrated in Fig. 5.
Figure 8:
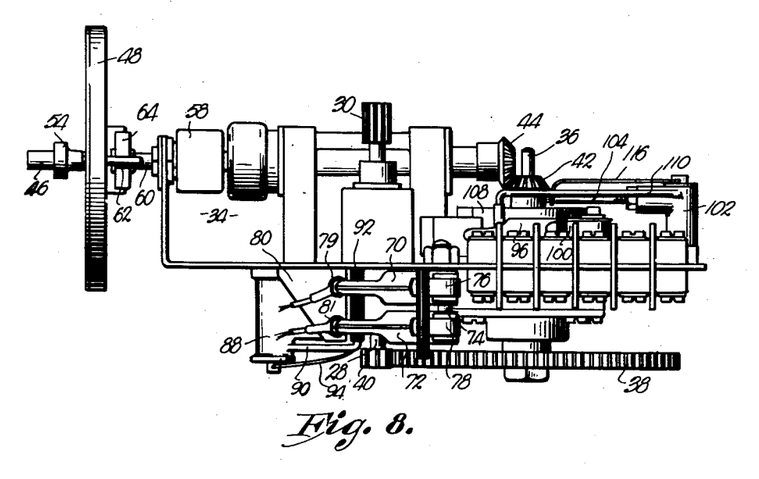
Fig. 8 is a top plan view of the mechanism shown in Figs. 5 to 7 inclusive.

A pair of removable plugs 54 and 56 selectively pass through the desired openings 50 and 52 and project beyond the rearwardmost face of the dial 48 in the manner shown in Figs. 5 and 7 of the drawings.

A toggle-switch 58 carried by the frame 34 has a rotatable shaft 60 to which is connected crossed arms 62 and 64 that are disposed in the path of travel of the projected ends of plugs 54 and 56.

A substantially circular, relatively wide cam member broadly designated by the numeral 65, is carried by the shaft 28 next adjacent the pinion 40. Cam 65 is divided into four equally spaced cam faces, each of which is defined at one end thereof by a shoulder having two offset shoulders 66 and 68.

A pair of switches 70 and 72 are carried in side-by-side relationship by frame 34 above the cam member 65 through the medium of a pivot pin 74 common to both switches. Springs 76 and 78 forming a part of switches 70 and 72 respectively, hold the latter biased toward the closed position in engagement with their respective stationary contacts 79 and 81 mounted upon a plate 80.

Each switch 70 and 72 is provided with a downturned ear, one only of which is shown in Fig. 7 on switch 72 and designated by the numeral 82, said ears being directly above the corresponding cam faces of the member 65. Cam member 65 is provided with four equally spaced lugs 84 on one face thereof adjacent each of the four shoulders 68 that move into contact with an arm 86 when shaft 28 and cam member 65 rotate.

Arm 86 is adjustably mounted in a housing 88 that is rotatably secured to the frame 34. Housing 88 also has projecting therefrom an L-shaped rod 90, one leg whereof is insulated as at 92 and extends between the cam member 65 and the switches 70 and 72.

A spring 94 extending from the pivotal mounting for housing 88 and connecting with the arm 90, holds the housing 84, pin 86 and rod 90 biased in a position where insulated arm 92 holds switches 70 and 72 normally in the open position.

In addition to switches 58, 70 and 72, framework 34 carries a fourth switch 96 that is located adjacent the intermeshing bevel gears 42 and 44 on that side of frame 34 opposite to the switches 70 and 72. Switch 96 is also held biased toward the closed position with respect to fixed contact 98 by a spring 100.

A rotatable housing 102, has an adjustably mounted arm 104 disposed within the path of travel of a single lug 106 mounted on one face of a cam member 108. Housing 102 is additionally provided with a lateral extending rod 110 that is L-shaped and has one leg thereof extending in underlying relationship to switch 96 and above cam 108. Switch 96 has a depending ear 112 disposed directly above cam 108. Cam 108 is mounted rigidly to the shaft 36 immediately behind bevel gear 42 and has a small notch 114 formed in its periphery in substantially diametrically opposed relationship to the projecting lug 106. Swinging movement of the arm 104, rod 110 and switch 96, through the action of a spring 116, is limited by a finger 118 on housing 102 contacting an extension 120 on the framework 34.

The sound reproducer chosen for illustration, is broadly designated by the numeral 122 and includes a pair of reels 124 and 126 rotatably mounted on the frame 34 and adapted to receive an elongated tape 128.

Figure 4:
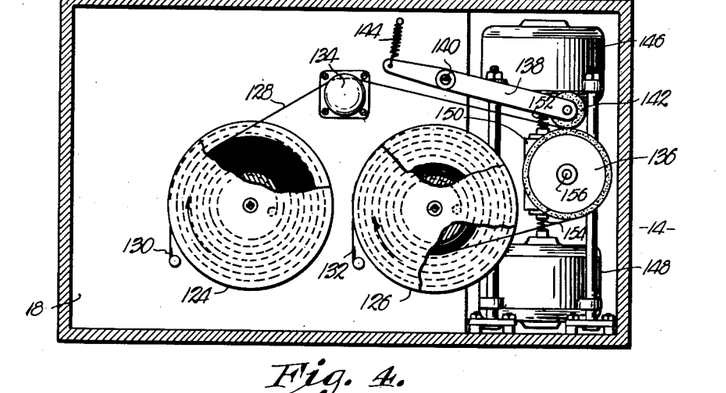
Fig. 4 is a transverse, cross-sectional view taken on line IV—IV of Fig. 3 looking in the direction of the arrows, parts being broken away for clearness.

Reels 124 and 126 normally rotate in the direction of the arrows indicated in Fig. 4 against the action of coil springs 130 and 132 respectively. Tape 128 passes from the reel 124 over a pick-up head 134 and thence over a drive wheel 136 that is preferably made from rubber or other resilient material or at least has its periphery so coated with such substance. From the drive wheel 136, the tape 128 is wound about the take-up reel 126.

An arm 138 pivotally mounted as at 140 on the frame 34, has a rubber roller 142 on one end thereof that is held biased against the tape 128 on wheel 136 by a spring 144.

Drive wheel 136 is rotated and the tape 128 is consequently moved either from reel 124 to reel 126 or vice versa through the medium of a pair of electric motors 146 and 148 having their drive shafts joined to a common gear box 150 disposed therebetween by spring couplings 152 and 154 respectively.

A shaft 156 extends from gear box 150 and receives the drive wheel 136.

It is appreciated that the particular type of sound reproducer that is used with the chronometer 22 is of no particular importance to the present invention and may constitute any one of the many types in common use. In the present instance, the tape 128 has its sound track recorded thereon and the original sounds are reproduced as tape 128 passes over pick-up 134, thereby generating a fluctuating voltage. Pick-up device 134 may consist either of a piezoelectric crystal, a magnet provided with a coil wound thereabout, or any other electrostatic arrangement capable of producing the aforesaid fluctuating voltage.

It is, of course, also contemplated that the conventional photoelectric cell and a source of light, might well be used, the tape 128 then comprising a photographic film that is passed betweel the cell and the light source. The fluctuating voltages produced by the pick-up device 134 are amplified in the usual manner into an audio-frequency current by means of an amplifier 158 having electrical connection with pick-up 134 and with speaker 20 as shown in Fig. 10.

Figure 10:
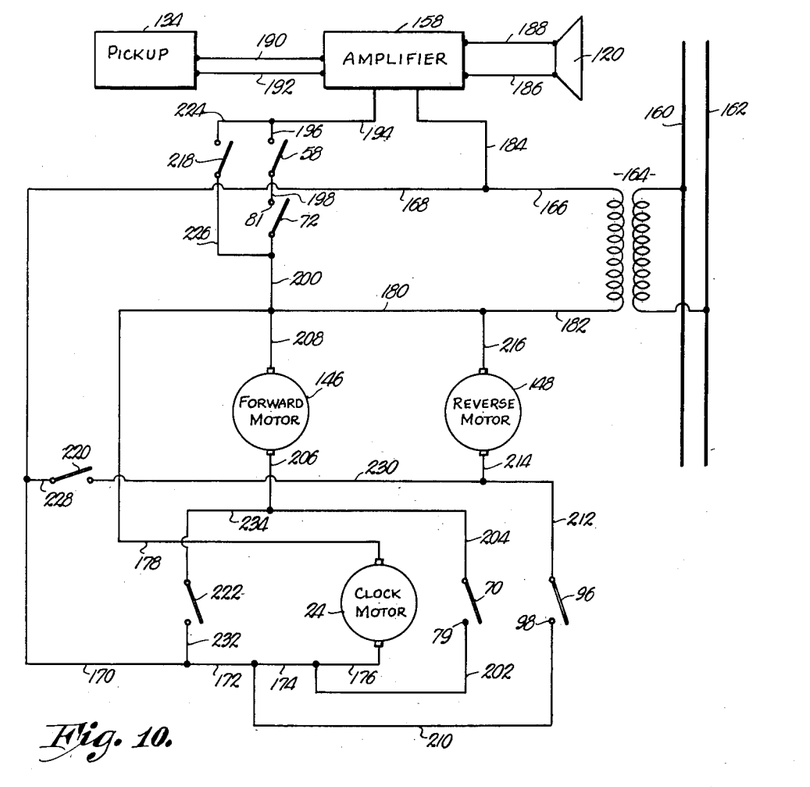
Fig. 10 is a wiring diagram illustrating the electrical phase of the modification of the present invention illustrated in Figs. 1 to 9 inclusive.

The electrical components of the apparatus and the manner of coupling the same are illustrated in Fig. 10 of the drawings wherein is shown a pair of lead lines 160 and 162 having connection with a suitable source of alternating current not shown. Lines 160 and 162 are in turn coupled with a transformer 164.

The continuously operating electric clock 24, has connection with the transformer 164 by means of the following circuit:

From transformer 164 through lines 166, 168, 170, 172, 174 and 176 through motor 24, lines 178, 180 and 182 to transformer 164.

As soon as the clock 22 commences to operate, thereby causing rotation of its shaft 26, the cam member 65 will also rotate until such time as one of the lugs 84 thereof moves into engagement with the arm 86. As arm 86 swings downwardly as shown in Fig. 7, rod 90 will move in a direction toward the depending ears 82 on switches 70 and 72 permitting downward swinging movement of the switches 70 and 72 by virtue of their springs 76 and 78 toward the stationary contacts 79 and 81. When switches 70 and 72 move downwardly, their depending ears 82 will move into engagement with the peripheral cam surface of member 65. As cam member 65 continues to rotate, the ear 82 on switch 72 will drop downwardly alongside the shoulder 68 that is adjacent thereto, closing switch 72 with respect to its stationary contact 81. Assuming switch 58 to be closed, the circuit through pick-up 134, amplifier 158 and speaker 20 is traced as follows:

From transformer 164, through lines 166 and 184, amplifier 158, line 186, speaker 20, line 188, amplifier 158, line 190, pick-up 134, line 192, amplifier 158, line 194, closed lines 194 and 196, closed switch 58, line 198, closed switch 72 and lines 200, 180 and 182 to transformer 164.

After the filaments of the amplifier tubes have become sufficiently heated, switch 70 will close with respect to its stationary contact 79 because of the continued movement of cam member 65, permitting the ear 82 of switch 70 to drop downwardly on one side of the adjacent shoulder 66.

Closing of the switch 70 will energize the motor 146 to drive the tape 128 forwardly from reel 124, across pick-up head 134 to reel 26, the circuit being traced as follows:

From transformer 164, through wires 166, 168, 170, 172, 174, 202, closed switch 70, wires 204 and 206, motor 146, and wires 208, 180 and 182 to transformer 164.

It is apparent from the foregoing that irrespective of the condition of switch 58, motor 146 will be energized every fifteen minutes because of the fact that switch 70 is closed four times for each complete revolution of the cam member 65. Obviously, the switch 72 will also be closed every fifteen minutes but no energization of the amplifier 158 will take place and accordingly, no sound will emanate from the sepaker 20 unless the switch 58 is in the closed position.

The operator accordingly determines the time of day when it is desired that the amplifier 158, pick-up 134 and speaker 20, should operate. He thereupon places the plug 54 into the desired opening 52, all 12 openings being preferably identified by suitable indicia (not shown) corresponding to the face of the clock 22. Obviously, as the dial 48 rotates continuously in an anti-clockwise direction as shown in Fig. 9, the plug 54 will eventually come into contact with one of the arms 62—64 of the switch 58. Once plug 54 thus closes the switch 58, amplifier 158 will be energized every fifteen minutes along with energization of the motor 146 until such time as the switch 58 is again opened. If the operator desired that the amplifier operate each fifteen minutes for one hour only, then he positions the plug 56 within the opening 50 next adjacent to and trailing the plug 54. Continued rotation of dial 48 will move plug 56 into contact with one of the arms 62—64 to reopen switch 58 whereby the amplifier 158 will remain inoperable irrespective of the periodic closing of switch 72 until such time as plug 54 again closes switch 58.

While the dial 48 chosen for illustration has been designed with 12 openings 50 and 12 openings 52 corresponding with the 12 numerals on the face of clock 22, it is obvious that the respective diameters of the rows of openings 50 and 52 might be increased considerably whereby the openings 52 would close switch 58 at a given hour, at a predetermined quarter hour or any other chosen sub-division of such period of time. Furthermore, by proper arrangement of the openings 50, the switch 58 could be opened by the plug 56 after switch 58 had been closed only 15 minutes.

The arrangement chosen for illustration with respect to dial 48 and its openings 50—52, together with the cam 65 and its four sub-divided faces and shoulders 66—68, takes into consideration the time for return of the tape 128 to the reel 124. It is contemplated that the periodic operation of motor 146 will wind the entire tape 128 on reel 126 in 12 hours, the tape 128 travelling approximately 4½ inches per second and being in motion approximately 15 seconds each time that motor 146 is energized.

After 12 complete revolutions of the clock shaft 26 and consequently, after one complete rotation of gear 38 and cam 108, extension 106 on cam 108 will move into engagement with arm 104, swinging rod 110 downwardly to permit the lug 112 on switch 96 to move into engagement with the periphery of cam 108. Upon continued rotation of cam 108, extension 112 will drop into the depression 114, causing closing of switch 96 with respect to its stationary contact 98. This energizes the reverse motor 148 through the following circuit:

From transformer 164 through wires 166, 168, 170, 172 and 210, closed switch 96, wires 212 and 214, motor 148 and wires 216 and 182 to transformer 164.

Motor 148 will continue to operate returning tape 128 to reel 124 until such time as lug 106 moves from arm 104, whereupon spring 116 will force rod 110 upwardly to swing switch 96 from engagement with contact 98. The time consumed for this return operation is less than 15 minutes and consequently, the reproducer will be in condition for operation when switches 70 and 72 are again closed by operation of the cam member 65.

For purposes of synchronization, there are provided three manually operable switches 218, 220 and 222. By closing of the switch 218, the amplifier 158, pick-up 134 and speaker 20 may be energized irrespective of the condition of switches 58 and 72 through the following circuit:

From transformer 164, through wires 166 and 184, amplifier 158, line 186, speaker 20, line 188, amplifier 158, wire 190, pick-up 134, wire 192, amplifier 158, wires 194 and 224, closed switch 218 and wires 226, 200, 180 and 182, to transformer 164.

With switch 218 either closed or open, either motor 146 or motor 148 may be energized irrespective of the condition of switches 222, 70 or 96. Closing of the switch 220, energizes the motor 148 through the following circuit:

From transformer 164, through lines 166, 168 and 228 through closed switch 220, lines 230 and 214, motor 148 and lines 216 and 182 to transformer 164.

Closing of the manual switch 222 energizes motor 146 through the following circuit:

From transformer 164 through lines 166, 168, 170, 172 and 232 through closed switch 222, lines 234, 206, motor 146 and lines 208, 180 and 182, to transformer 164.

It is appreciated that in lieu of a pair of motors 146 and 148, a single reversible motor might well be used, however certain operational difficulties arise requiring expensive and complicated instrumentalities to eliminate outside noise in the speaker 20 when amplifier 158 and pick-up 134 are operated. In any event, it is difficult to return the tape 128 to the reel 124 with great speed requiring that the amplifier 158 and the motor 146 not operate at periodic intervals longer than the length of time that it takes for return of the tape 128.

Figure 11:
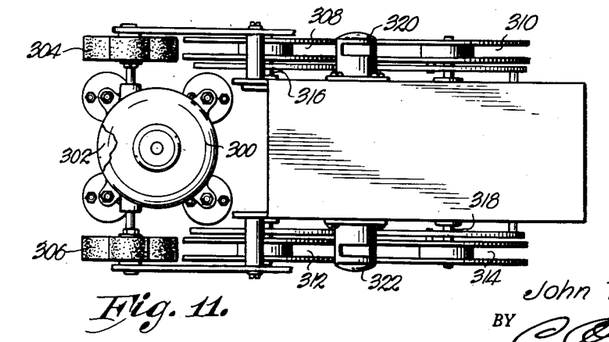
Fig. 11 is a top plan schematic view of a modified form of my present invention.
Figure 12:
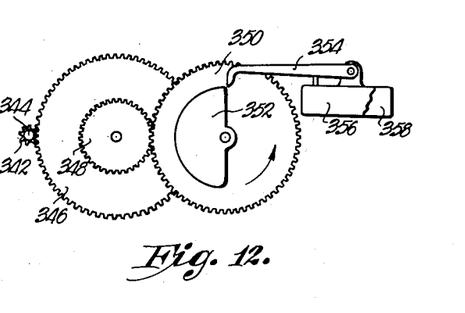
Fig. 12 is a side elevational view showing one of the controls of the form shown in Fig. 11.
Figure 13:
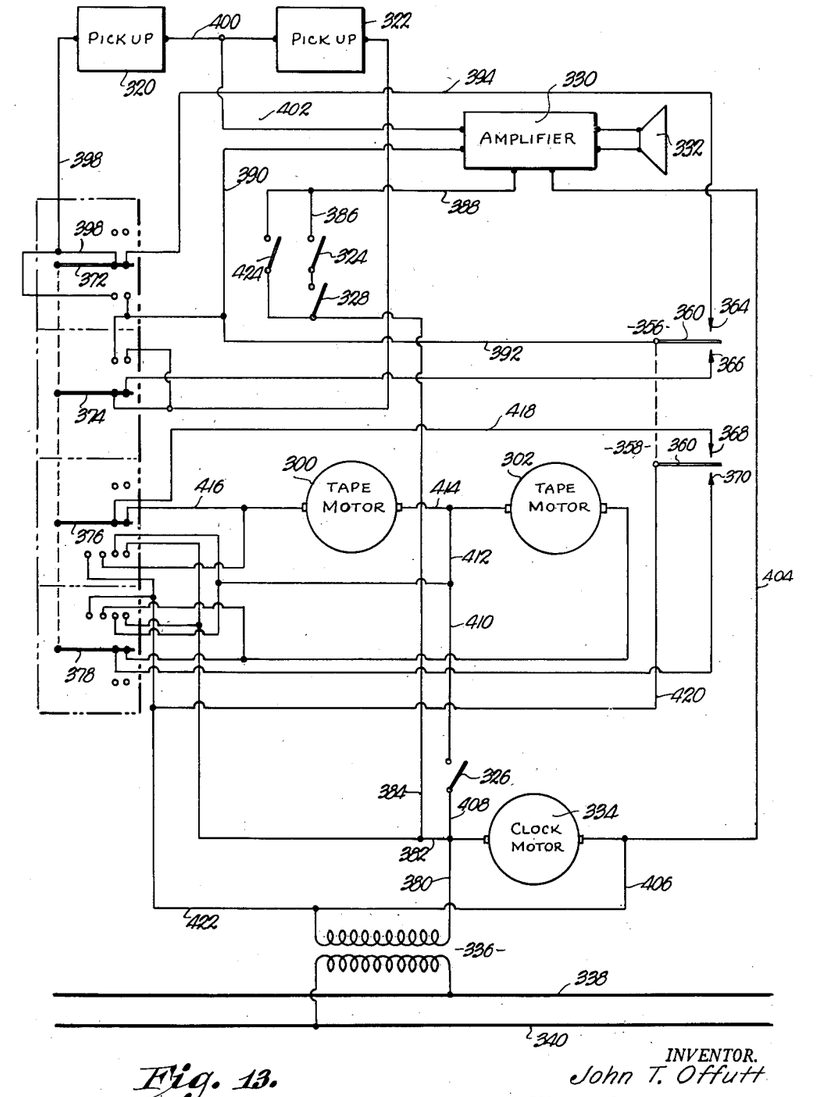
Fig. 13 is a wiring diagram illustrating the electrical operation of the modification of Fig. 11.

To eliminate this difficulty, the modified form of my invention has been provided and illustrated in Figs. 11, 12 and 13. For the most part, component elements of the modified form include those above described in that there is a pair of motors 300 and 302 having a pair of tape drive wheels 304 and 306 respectively.

Each drive wheel 304 and 306 moves a separate tape between a pair of reels 308 and 310 corresponding to wheel 304 and reels 312 and 314 corresponding to the drive wheel 306.

The reels 308 and 312 are mounted on a common shaft 316 while reels 310 and 314 have a common mounting shaft 318. There is also provided a pair of pick-up heads 320 and 322 for the two tapes utilized in the modified form.

A selector dial is provided for the modified form in the same manner as above described and having the same characteristics as dial 48 or opening and closing a switch 324. Similarly, there are provided a pair of cam operated switches 326 and 328 corresponding to switches 70 and 72 of the first mentioned form of my invention. Amplifier 330, a speaker 332, a clock motor 334, a transformer 336 and a pair of lead lines 338 and 340 correspond directly with similar parts shown in Fig. 10 of the drawings.

The return switch 96 shown in Fig. 5 and its component actuating parts including cam 108 on shaft 36, are, however, eliminated in the present form of the invention, there being structure as shown in Fig. 12 substituted therefor.

In Fig. 12, pinion 342 on clock shaft 344 corresponds to pinion 40 and gear 346 comprises the same gear as the gear 38 in the first described form of the invention. There is added a gear 348 smaller than gear 346 but rotatable therewith on a common axis and a larger gear 350 that meshes with gear 348. The gears 348 and 350 have a 2 to 1 ratio.

One face of the gear 350 is provided with a substantially semi-circular cam member 352 that actuates an L-shaped arm 354 to in turn control a pair of switch assemblies 356 and 358. Assemblies 356 and 358 are provided with movable contact arms 360 and 362 respectively that are "ganged" together for simultaneous movement.

Arm 360 is provided with a pair of opposed stationary contacts 364 and 366, while arm 362 is similarly provided with a pair of opposed stationary contacts 368 and 370. It is clear that when the arm 354 is riding upon the periphery of the cam 352, arms 360 and 362 will be closed with respect to contacts 364 and 368 respectively. Conversely, when the arm 354 swings downwardly by virtue of being out of engagement with the cam element 352, arms 360 and 362 will engage their respective stationary contacts 366 and 370.

When the reproducing device shown in Fig. 11 is originally placed in operation, the two tapes are wound upon reels 308 and 312 respectively in opposite directions. These tapes are thereupon threaded over the respective heads 320 and 322 and around the corresponding drive wheels 304 and 306 for connection with the reels 310 and 314. When motor 300 is energized to actuate wheel 304 and the tape thereon, and when amplifier 330 is operating, the head 320 will operate to produce the current to be supplied to amplifier 330. Motor 300 also drives the tape on wheel 306 in a reverse manner from reel 312 to reel 314, the pick-up head 322 being inoperable all the while the tapes move from reels 308 and 312. Conversely, when motor 302 is placed in operation, the wheels 304 and 306 will return the tapes to the reels 308 and 312, pick-up head 322 being operable and pick-up head 320 being inoperable.

During normal operation, four interconnected manually operable switches 372, 374, 376 and 378 are in the closed condition illustrated in Fig. 13. Assuming the dial actuated switch 328 to be closed and assuming cam 352 to be in a position where arms 360 and 362 are in a closed position with respect to stationary contacts 364 and 368, closing of the cam switch 328 energizes pick-up 320, amplifier 330 and speaker 332 through the following circuit:

From transformer 336, through wires 380, 382, and 384, closed switches 328 and 324, wires 386 and 388, amplifier 330, wires 390 and 392, closed contacts 360—364, wire 394, closed switch 372, wires 396 and 398, pick-up 320, wires 400 and 402, amplifier 330, speaker 332 and wires 404 and 406, to transformer 336.

When cam operated switch 326 closes, shortly after the closing of switch 328, motor 300 will be energized through the following circuit:

From transformer 336 through wires 380 and 408, closed switch 326, wires 410, 412 and 414, motor 300, wire 416, closed switch 376, wire 418, closed contacts 362—368, wires 420 and 422, to transformer 336.

It is obvious that when the arms 360 and 362 swing to a position in connection with contacts 366 and 370 respectively, motor 302 will be energized upon the closing of switch 326. It is also apparent that when the switch assemblies 356 and 358 are in the condition just above mentioned, closing of switches 324 and 328 will energize the amplifier 330 and speaker 332 and will bring pick-up 322 in series with amplifier 332 in lieu of the pick-up 320.

These last mentioned circuits need not be traced since it is obvious that the same will close through the switches 374 and 376 respectively.

Clock motor 334 is continuously energized through coupling with transformer 336 as clearly shown in Fig. 13. It is also apparent that a manually manipulable by-pass switch 424 will energize amplifier 330 and speaker 332 irrespective of the condition of switches 324 and 328.

When it is desired to synchronize the apparatus by energization of either the motor 300 or 302, it is necessary to deenergize pick-up 322 and energize pick-up 320 when motor 300 operates. Conversely, when the operator desires to energize motor 302, he must be assured that pick-up 320 is deenergized and the pick-up 322 is operated. Consequently, the switches 372, 374, 376 and 378 are utilized to accomplish these desires irrespective of the position of switch 326 or of the assemblies 356 and 358.

This manual switching operation forms no particular part of the present invention and need not be described by tracing the individual circuits.

Upward swinging movement of switches 372, 374, 376 and 378 operates to cause switch 372 to deenergize pick-up head 320. Switch 374 energizes pick-up head 322, switch 376 deenergizes motor 300 and switch 378 energizes motor 302. When the four manually operated switches move downwardly, switches 372 and 376 energize pick-up head 320 and motor 300 respectively. Switches 374 and 378 deenergize pick-up 322 and motor 302 respectively.

These operations of the four "ganged" switches, take place irrespective of the positions of the switches 326, 360 and 362.

It is clear through use of the modification of my invention just described, there will always be a reproducer tape in a position for operation throughout a 24 hour period of time. As soon as one tape is completely threaded on its take-up reel, the other tape will have returned to its starting position and be ready to operate in connection with its corresponding pick-up head. The intervals between operations need not therefore, be spaced apart 15 minutes as in the case of the first described modification and the operator can control operation through use of the selector dial for intervals relatively close together, depending of course, upon how long it is desired that each announcement shall continue. The sound that is reproduced will, of course, depend upon that originally recorded upon the tapes and it is clear that such sounds are entirely within the discretion of the user.

It is contemplated that music might well accompany any given announcement and by way of specific example, the time of day could be announced periodically and particularly the device might be used as an awakening means whereby the announcement would commence with a period of music, continue with an announcement that it is time to arise and then continue with soft music for a short period of time. In any event the entire apparatus is simple to control and can be kept in synchronization at all times irrespective of any possible break in the circuit by means of the manual switching devices described in each instance.

Having thus described the invention, what is claimed as new and desired to be secured by Letters Patent is:

1. In apparatus having a constant speed rotatable shaft, and a sound reproducer including a movable sound track, electrical means for advancing said sound track, a first electrical circuit for said electrical means, a pick-up responsive to the moving sound track for generating electrical voltages, an amplifier coupled with said pick-up for converting said voltages to audio-frequency signals, and a second electrical circuit for said amplifier, the improvement of which comprises a normally open switch in each of said circuits respectively; mechanism operably connected with the shaft and disposed to periodically engage the switches for a predetermined period of time as the shaft rotates to close the switches for said period of time; a circuit breaker in one of said circuits; and structure operably connected with the shaft and disposed to periodically engage the circuit breaker to alternately open and close the latter.

2. In apparatus as set forth in claim 1 wherein said structure includes a rotatable dial having a plurality of plugs thereon, said circuit breaker being within the path of travel of said plugs.

3. In apparatus as set forth in claim 2 wherein said dial is provided with a plurality of openings, each adapted to receive the plugs whereby the number of times the circuit breaker is engaged by the plugs for each predetermined period of time may be selected.

4. In apparatus as set forth in claim 1 wherein said mechanism is provided with parts for engaging the switch in the second circuit prior to engaging the switch in the first circuit.

5. In apparatus having a constant speed rotatable shaft, and a sound reproducer including a movable sound track, electrical actuating means for said sound track, a first primary circuit for advancing said actuating means, a second primary circuit for reversing said actuating means, a pick-up responsive to the moving sound track for generating electrical voltages, an amplifier coupled with said pick-up for converting said voltages to audio-frequency signals, and a secondary circuit for said amplifier, the improvement of which comprises a normally open switch in each of said primary circuits respectively; a normally open make and break assembly and a circuit breaker in said secondary circuit; mechanism operably connected with said shaft and disposed to periodically engage the switch in the first primary circuit and said make and break assembly for a predetermined period of time as the shaft rotates to close the same for said period of time; structure operably connected with the shaft and disposed to periodically engage the circuit breaker to alternately open and close the latter; and means operably connected with said shaft and disposed to periodically engage the switch in the second primary circuit for a predetermined period of time when the one switch is open to close the other switch for said last-mentioned period of time.

6. In apparatus having a constant speed rotatable shaft, and a sound reproducer including a movable sound track, electrical means for advancing said sound track, a first electrical circuit for said electrical means, a pick-up responsive to the moving sound track for generating electrical voltages, an amplifier coupled with said pick-up for converting said voltages to audio-frequency signals, and a second electrical circuit for said amplifier, the improvement of which comprises a normally open switch in each of said circuits respectively; a circuit breaker in said second electrical circuit; structure operably connected with the shaft and disposed to periodically engage the circuit breaker to alternately open and close the latter; and mechanism operably connected with said shaft and disposed to engage and thereby close the switches a plurality of times each time the said circuit breaker is engaged, said mechanism having parts for holding the switches closed a predetermined period of time during each engagement therewith.

7. In apparatus having a constant speed rotatable shaft, and a sound reproducer including a movable sound track, electrical actuating means for said sound track, a first primary circuit for advancing said actuating means, a second primary circuit for reversing said actuating means, a pick-up responsive to the moving sound track for generating electrical voltages, an amplifier coupled with said pick-up for converting said voltages to audio-frequency signals, and a secondary circuit for said amplifier, the improvement of which comprises a normally open switch in each of said primary circuits respectively; a normally open make and break assembly and a circuit breaker in said secondary circuit; structure operably connected with the shaft and disposed to periodically engage the circuit breaker to alternately open and close the latter; mechanism operably connected with said shaft and disposed to engage and thereby close one of said switches and said make and break assembly a plurality of times each time the circuit breaker is engaged, said mechanism having parts for holding the one switch and the make and break assembly closed a predetermined period of time during each engagement therewith; and means operably connected with said shaft and disposed to periodically engage the switch in the second primary circuit for a predetermined period of time when the one switch is open to close the other switch for said last-mentioned period of time.

8. In apparatus having a constant speed rotatable shaft, and a sound reproducer including a movable sound track, electrical actuating means for said sound track, a first primary circuit for advancing said actuating means, a second primary circuit for reversing said actuating means, a pick-up responsive to the moving sound track for generating electrical voltages, an amplifier coupled with said pick-up for converting said voltages to audio-frequency signals, and a secondary circuit for said amplifier, the improvement of which comprises a normally open switch in each of said primary circuits respectively; a normally open make and break assembly in said secondary circuit; mechanism operably connected with said shaft and disposed to periodically engage the switch in the first primary circuit and said make and break assembly for a predetermined period of time as the shaft rotates to close the same for said period of time; and means operably connected with said shaft and disposed to periodically engage the switch in the second primary circuit for a predetermined period of time when the one switch is open to close the other switch for said last-mentioned period of time.

9. In apparatus having a constant speed rotatable shaft, and a sound reproducer including a pair of movable sound tracks, electrical actuating means common to the sound tracks for moving one sound track forwardly and simultaneously moving the other sound track rearwardly, a first primary circuit for advancing said actuating means, a second primary circuit for reversing said actuating means, a pick-up for each sound track respectively and responsive to forward movement thereof for generating electrical voltages, an amplifier coupled with said pick-ups for converting said voltages to audio-frequency signals, and a secondary circuit for said amplifier, the improvement of which comprises means operably coupled with said shaft for alternately coupling the pick-ups with said secondary circuit; a normally open switch in each of said primary circuits respectively; a normally open make and break assembly in said secondary circuit; mechanism operably connected with said shaft and disposed to periodically engage the switch in the first primary circuit and said make and break assembly for a predetermined period of time as the shaft rotates to close the same for said period of time; and means operably connected with said shaft and disposed to periodically engage the switch in the second primary circuit for a predetermined period of time when the one switch is open to close the other switch for said last-mentioned period of time.

JOHN T. OFFUTT.

References Cited in the file of this patent

UNITED STATES PATENTS

| Number | Name | Date |
| --- | --- | --- |
| 1,227,523 | Blessing | May 22, 1917 |
| 1,424,516 | Pinto | Aug. 1, 1922 |
| 1,796,906 | Zimmer | Mar. 17, 1931 |
| 1,862,475 | Franklin | June 7, 1932 |
| 2,011,216 | Franklin | Aug. 13, 1935 |
| 2,020,457 | Cosgrove | Nov. 12, 1935 |
| 2,063,385 | Koenig | Dec. 8, 1936 |
| 2,066,041 | Kiel | Dec. 29, 1936 |
| 2,260,655 | Barr | Oct. 28, 1941 |
| 2,348,204 | Burbank | May 8, 1944 |
| 2,348,953 | Briggs | May 16, 1944 |